(12) United States Patent
Hori

(10) Patent No.: US 11,044,116 B2
(45) Date of Patent: Jun. 22, 2021

(54) MANAGEMENT DEVICE, COMMUNICATION SYSTEM, MANAGEMENT METHOD, AND COMPUTER READABLE MEDIUM

(71) Applicant: MITSUBISHI ELECTRIC CORPORATION, Tokyo (JP)

(72) Inventor: Toshinori Hori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/610,780

(22) PCT Filed: Jun. 27, 2017

(86) PCT No.: PCT/JP2017/023647
§ 371 (c)(1),
(2) Date: Nov. 4, 2019

(87) PCT Pub. No.: WO2019/003322
PCT Pub. Date: Jan. 3, 2019

(65) Prior Publication Data
US 2020/0162284 A1    May 21, 2020

(51) Int. Cl.
*H04L 12/417* (2006.01)
*H04L 12/403* (2006.01)
(Continued)

(52) U.S. Cl.
CPC ...... *H04L 12/417* (2013.01); *H04L 12/40143* (2013.01); *H04L 12/413* (2013.01); *H04L 12/4604* (2013.01); *H04L 2012/40241* (2013.01)

(58) Field of Classification Search
CPC ......... H04L 12/40143; H04L 12/40156; H04L 12/413; H04L 12/417; H04L 12/4604;
(Continued)

(56) References Cited

U.S. PATENT DOCUMENTS

| 5,469,439 A | 11/1995 | Thaler et al. |
| 5,519,709 A | 5/1996 | Albrecht et al. |

(Continued)

FOREIGN PATENT DOCUMENTS

| JP | 8-265356 A | 10/1996 |
| JP | 8-307442 A | 10/1996 |

(Continued)

OTHER PUBLICATIONS

International Search Report, issued in PCT/JP2017/023647, PCT/ISA/210, dated Aug. 22, 2017.
(Continued)

*Primary Examiner* — Paul H Masur
(74) *Attorney, Agent, or Firm* — Birch, Stewart, Kolasch & Birch, LLP

(57) ABSTRACT

A communication master device (101) manages a plurality of communication slave devices (102). An investigation unit (301) investigates status of retention of transmission waiting data in the plurality of communication slave devices (102). A period specification unit (302) specifies a length of a transmission permitted period in which transmission of the transmission waiting data is permitted and a length of a transmission prohibited period in which the transmission of the transmission waiting data is prohibited, based on the status of the retention of the transmission waiting data in the plurality of communication slave devices (102).

20 Claims, 11 Drawing Sheets

(51) Int. Cl.
*H04L 12/40* (2006.01)
*H04L 12/413* (2006.01)
*H04L 12/46* (2006.01)

(58) Field of Classification Search
CPC . H04L 2012/6451; H04L 2012/40241; H04W 74/08; H04W 74/0808
See application file for complete search history.

(56) References Cited

U.S. PATENT DOCUMENTS

| | | | |
|---|---|---|---|
| 5,701,305 A | 12/1997 | Albrecht | |
| 5,768,250 A | 6/1998 | Albrecht | |
| 5,919,250 A | 7/1999 | Shimokawa | |
| 6,721,331 B1 * | 4/2004 | Agrawal | H04L 12/413 370/448 |
| 6,778,557 B1 | 8/2004 | Yuki et al. | |
| 7,701,949 B1 | 4/2010 | Rose et al. | |
| 2011/0113093 A1 | 5/2011 | Ido et al. | |

FOREIGN PATENT DOCUMENTS

| | | |
|---|---|---|
| JP | 11-298513 A | 10/1999 |
| JP | 2011-83023 A | 4/2011 |
| JP | 2012-205012 A | 10/2012 |
| JP | 2017-17498 A | 1/2017 |
| JP | 2017-59972 A | 3/2017 |
| WO | WO 2009/075068 A1 | 6/2009 |

OTHER PUBLICATIONS

Notice of Examination Opinion for Taiwanese Application No. 106134692, dated Mar. 28, 2019.

Notice of Examination Opinion for Taiwanese Application No. 106134692, dated Sep. 26, 2018.

Notice of Reasons for Refusal for Japanese Application No. 2017-559903, dated Jan. 16, 2018.

* cited by examiner

Fig. 9

| COMMUNICATION SLAVE DEVICE NAME | NON-PRIORITY DATA RETENTION STATUS |
|---|---|
| 102-a | 1 |
| 102-b | 1 |
| 102-c | 1 |

MANAGEMENT DEVICE, COMMUNICATION SYSTEM, MANAGEMENT METHOD, AND COMPUTER READABLE MEDIUM

TECHNICAL FIELD

The present invention relates to a communication system.

BACKGROUND ART

Currently, LAN (Local Area Network) with use of Ethernet (registered trademark) of CSMA/CD (Carrier Sense Multiple Access with Collision Detection) scheme is prevailing.

In a network with use of Ethernet (registered trademark), data exists in various protocols or with various priorities. For instance, it is considered that priority data of which real-time property is highly required and non-priority data of which the real-time property is not highly required coexist in a factory. As the priority data, data that directly relates to control over a production line is assumed. As the non-priority data, information on operation status of equipment in a production line or information on maintenance of the equipment is assumed.

Under such circumstance, if the non-priority data is transmitted when the priority data is generated, the priority data cannot be transmitted, so that propagation delay is increased. According to Patent Literature 1, a communication cycle composed of a phase of transmitting the priority data and a phase of transmitting the non-priority data is set. According to Patent Literature 1, the phase of transmitting the priority data and the phase of transmitting the non-priority data are controlled with time-division, so that transmission of the priority data may not be influenced by transmission of the non-priority data.

In a network with use of Ethernet (registered trademark), a switching hub is frequently used in order that numbers of terminals participating in the network may be increased. A general-purpose switching hub is incapable of switching between the phase of transmitting the priority data and the phase of transmitting the non-priority data. Therefore, a technique of Patent Literature 1 requires a dedicated switching hub that is capable of the switching between the phase of transmitting the priority data and the phase of transmitting the non-priority data.

CITATION LIST

Patent Literature

Patent Literature 1: JP H11-298513 A

SUMMARY OF INVENTION

Technical Problem

An example will be considered in which a plurality of terminals carry out the switching between the phase of transmitting the priority data and the phase of transmitting the non-priority data in a network to which the plurality of terminals are connected through a general-purpose switching hub.

In the phase of transmitting the non-priority data, the non-priority data transmitted from the terminals is accumulated in the switching hub. Subsequently, at a time after switching to the phase of transmitting the priority data, the non-priority data accumulated in the switching hub is transmitted from the switching hub. Therefore, the technique of Patent Literature 1 has a problem in that transmission of the priority data may be delayed by the non-priority data accumulated in the switching hub.

The present invention mainly aims at settling such a problem. More specifically, the present invention mainly aims at preventing transmission of data having higher priority from being delayed by data having lower priority.

Solution to Problem

A management device to manage a plurality of communication devices, the management device includes:

an investigation unit to investigate status of retention of transmission waiting data in the plurality of communication devices; and a period specification unit to specify a length of a transmission permitted period in which transmission of the transmission waiting data is permitted and a length of a transmission prohibited period in which the transmission of the transmission waiting data is prohibited, based on the status of the retention of the transmission waiting data in the plurality of communication devices.

Advantageous Effects of Invention

In the present invention, the length of the transmission permitted period and the length of the transmission prohibited period that are appropriate are dynamically determined based on the status of the retention of the transmission waiting data. According to the present invention, therefore, relaying of the transmission waiting data transmitted in the transmission permitted period is completed within the transmission prohibited period, so that a situation can be avoided in which delay occurs in transmission of data having higher priority due to the transmission waiting data having lower priority.

BRIEF DESCRIPTION OF DRAWINGS

FIG. 9 is a diagram illustrating an example of a non-priority data retention management table according to Embodiment 1.

DESCRIPTION OF EMBODIMENTS

Figure 1:
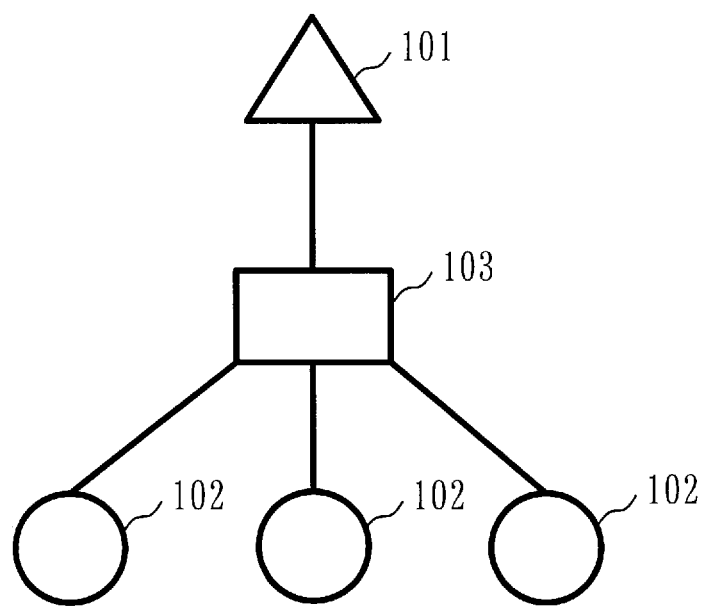
FIG. 1 is a diagram illustrating a configuration example of a communication system according to Embodiment 1.

Hereinbelow, embodiments of the present invention will be described with use of the drawings. In following description of and the drawings of the embodiments, elements provided with identical reference characters represent identical parts or corresponding parts.

Embodiment 1

Description of Configurations

FIG. 1 illustrates a configuration example of a communication system according to the present embodiment.

In the communication system according to the present embodiment, one communication master device 101, a plurality of communication slave devices 102, and one or more switching hubs 103 are connected by Ethernet cables.

The communication master device 101 manages the plurality of communication slave devices 102.

The communication slave devices 102 each transmit priority data and non-priority data to the communication master device 101. The priority data is data having higher priority. The non-priority data is data having lower priority.

The priority data and the non-priority data that are transmitted from the communication slave devices 102 are accumulated in the switching hub 103 and are relayed from the switching hub 103 to the communication master device 101. The switching hub 103 is a general-purpose switching hub. That is, the switching hub 103 does not have a function of switching between a phase of transmitting the priority data and a phase of transmitting the non-priority data.

The communication master device 101 receives the priority data and the non-priority data that are transmitted from the communication slave devices 102, through the switching hub 103.

In the present embodiment, data transmission from the communication slave devices 102 to the communication master device 101 is carried out in accordance with a predetermined communication cycle.

Each communication cycle is distinguished into a priority period and a non-priority period. The non-priority period is further distinguished into a transmission permitted period and a transmission prohibited period. The priority period is a period for the transmission of the priority data by the plurality of communication slave devices 102. The non-priority period is a period for transmission of the non-priority data by the plurality of communication slave devices 102. The transmission permitted period is a period in which the transmission of the non-priority data is permitted. The transmission prohibited period is a period in which the transmission of the non-priority data is prohibited.

In the present embodiment, the communication cycles proceed in a sequence of communication cycle n {priority period→non-priority period (transmission permitted period→transmission prohibited period)}→communication cycle (n+1) {priority period→non-priority period (transmission permitted period→transmission prohibited period)}. That is, each of the communication slave devices 102 transmits the priority data to the switching hub 103 in the priority period. Subsequently, each of the communication slave devices 102 transmits the non-priority data to the switching hub 103 in the transmission permitted period. After that, each of the communication slave devices 102 suspends the transmission of the non-priority data during the transmission prohibited period. At arrival of the priority period, each of the communication slave devices 102 transmits the priority data to the switching hub 103 again.

In the present embodiment, suspension of the transmission of the non-priority data from the communication slave devices 102 during the transmission prohibited period makes it possible for the switching hub 103 to complete the transmission of the accumulated non-priority data to the communication master device 101 within the transmission prohibited period. Therefore, a situation can be avoided in which delay occurs in the transmission of the priority data due to the non-priority data accumulated in the switching hub 103. However, if a length of the transmission permitted period and a length of the transmission prohibited period are set so as to be fixed, such problems as following may occur depending on status of retention of the non-priority data waiting to be transmitted in each of the communication slave devices 102 (hereinbelow, the non-priority data waiting to be transmitted will be referred to as transmission waiting data). In a case where the transmission permitted period has been set so as to be prolonged if there are many communication slave devices 102 which retain the transmission waiting data, for instance, the transmission of the accumulated non-priority data by the switching hub 103 may not be completed within the transmission prohibited period. As a result, the transmission of the priority data may be delayed. In a case where the transmission permitted period has been set so as to be shortened if there are few communication slave devices 102 which retain the transmission waiting data, by contrast, the transmission of the non-priority data by the switching hub 103 may be early completed, so that the period in which the communication slave devices 102 are not allowed to transmit the non-priority data may be made longer than necessary. Therefore, an efficiency of the transmission of the non-priority data may be decreased.

In the present embodiment, the communication master device 101 determines an appropriate length of the transmission permitted period and an appropriate length of the transmission prohibited period in accordance with the status of the retention of the transmission waiting data in each of the communication slave devices 102, so that the efficiency of the transmission of the non-priority data may be increased without the delay in the transmission of the priority data.

The communication master device 101 corresponds to the management device. Operation that is carried out by the communication master device 101 corresponds to the management method and the management program.

Each of the communication slave devices 102 corresponds to the communication device. The switching hub 103 corresponds to the relay device.

Figure 2:
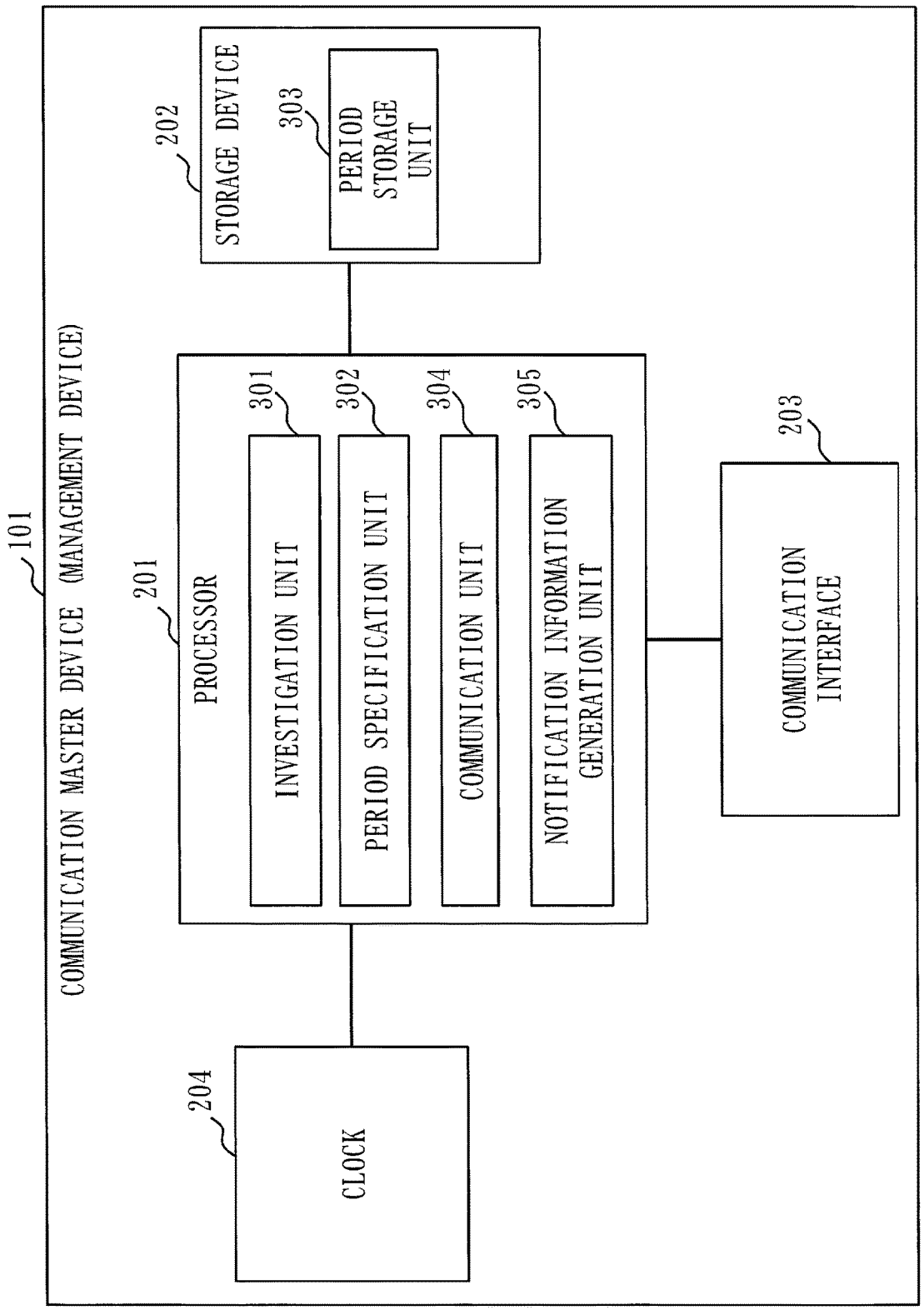
FIG. 2 is a diagram illustrating a hardware configuration example of a communication master device according to Embodiment 1.

FIG. 2 illustrates a hardware configuration example of the communication master device 101.

The communication master device 101 is a computer.

The communication master device 101 includes a processor 201, a storage device 202, a communication interface 203, and a clock 204, as hardware.

In the storage device 202, programs that fulfil functions of an investigation unit 301, a period specification unit 302, a communication unit 304, and a notification information generation unit 305 that will be described later are stored.

Operation of the investigation unit 301, the period specification unit 302, the communication unit 304, and the notification information generation unit 305 that will be described later is carried out by execution of the programs by the processor 201.

FIG. 2 schematically represents a state in which the processor 201 executes the programs that fulfil the functions of the investigation unit 301, the period specification unit 302, the communication unit 304, and the notification information generation unit 305.

The storage device 202 implements a period storage unit 303.

The communication interface 203 is used for communication with the communication slave devices 102.

The clock 204 is used for time synchronization with the communication slave devices 102.

Figure 3:
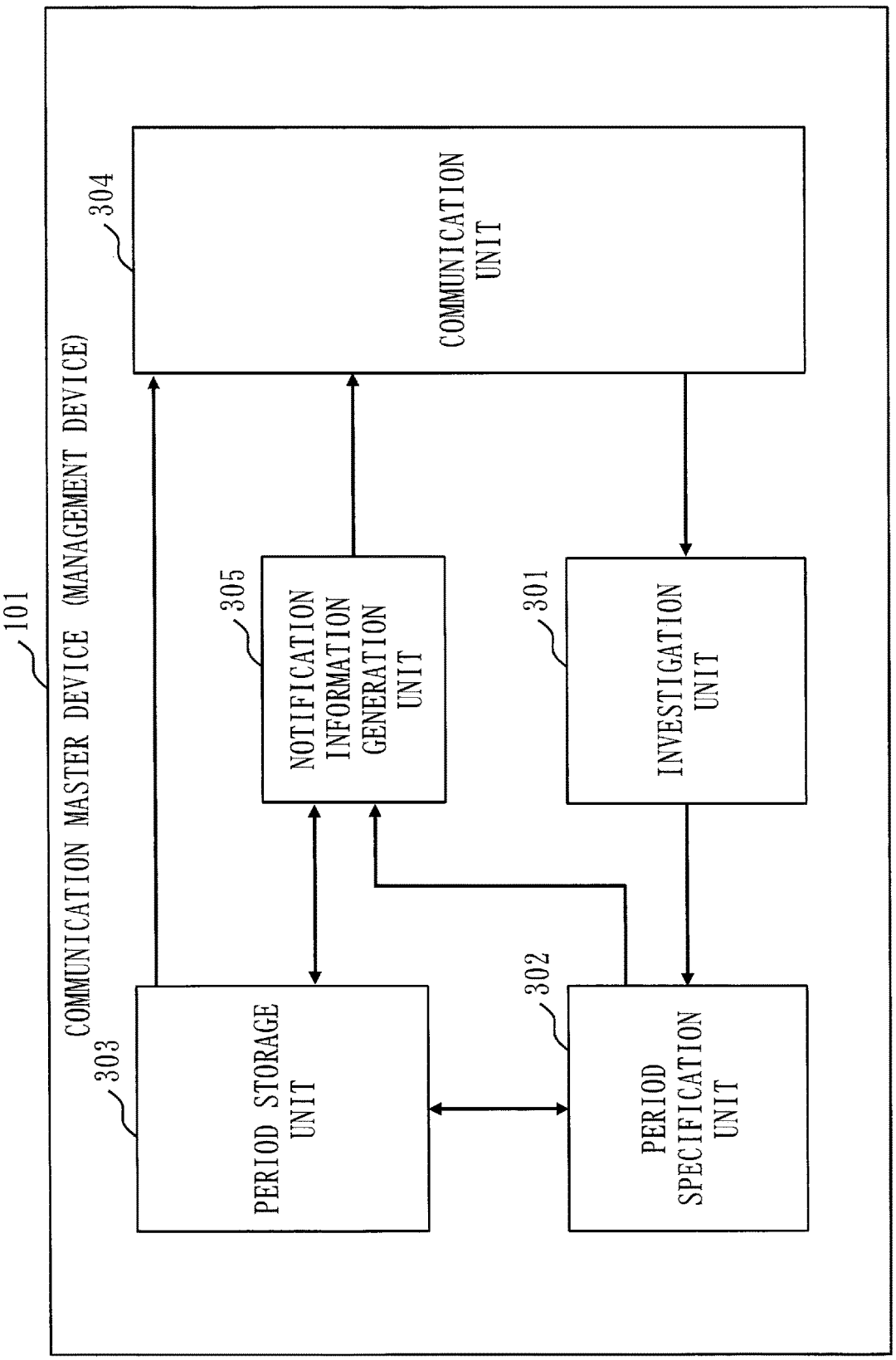
FIG. 3 is a diagram illustrating a functional configuration example of the communication master device according to Embodiment 1.

FIG. 3 illustrates a functional configuration example of the communication master device 101.

The communication master device 101 is composed of the investigation unit 301, the period specification unit 302, the period storage unit 303, the communication unit 304, and the notification information generation unit 305.

The investigation unit 301 investigates the status of the retention of the transmission waiting data in the plurality of communication slave devices 102. The investigation unit 301 receives non-priority data retention notification information from each of the communication slave devices 102 and thereby investigates the status of the retention of the transmission waiting data in the plurality of communication slave devices 102. In the present embodiment, whether the communication slave device 102 retains the transmission waiting data or not is indicated in the non-priority data retention notification information. In the present embodiment, namely, the investigation unit 301 analyzes the non-priority data retention notification information and thereby investigates the number of the communication slave devices 102 retaining the transmission waiting data.

A process that is carried out by the investigation unit 301 corresponds to the investigation process.

The period specification unit 302 specifies lengths of communication periods. More specifically, the period specification unit 302 specifies the length of the priority period, the length of the transmission permitted period, and the length of the transmission prohibited period, as the lengths of the communication periods.

The period specification unit 302 may specify the length of the priority period by any method. The period specification unit 302 does not have to specify the length of the priority period. For instance, a user of the communication master device 101 may specify the length of the priority period.

For the present embodiment, principally, a method of specifying the length of the transmission permitted period and the length of the transmission prohibited period will be described.

The period specification unit 302 specifies the length of the transmission permitted period and the length of the transmission prohibited period so that the relaying of the transmission waiting data transmitted to the switching hub 103 from the communication slave devices 102 retaining the transmission waiting data within the transmission permitted period may be completed within the transmission prohibited period in the switching hub 103.

The period specification unit 302 changes the method of specifying the length of the transmission permitted period and the length of the transmission prohibited period, when the status of the retention of the transmission waiting data in the communication slave devices 102 is identified.

Before the status of the retention of the transmission waiting data in the communication slave devices 102 is identified, the length of the transmission permitted period and the length of the transmission prohibited period are specified based on the number of the communication slave devices 102. More specifically, the period specification unit 302 specifies a value obtained by dividing total time of the transmission permitted period and the transmission prohibited period by a total number of the number of the communication slave devices 102 and a predetermined additional number, as the length of the transmission permitted period. The period specification unit 302 also specifies a value obtained by subtracting the specified length of the transmission permitted period from the total time, as the length of the transmission prohibited period.

After the status of the retention of the transmission waiting data in the communication slave devices 102 is identified, the period specification unit 302 specifies the length of the transmission permitted period and the length of the transmission prohibited period, based on the status of the retention of the transmission waiting data in the communication slave devices 102. More specifically, the period specification unit 302 specifies a value obtained by dividing the total time by a total number of the number of the communication slave devices 102 retaining the transmission waiting data and the additional number, as a new length of the transmission permitted period. The period specification unit 302 also specifies a value obtained by subtracting the specified new length of the transmission permitted period from the total time, as a new length of the transmission prohibited period.

Thus the period specification unit 302 is capable of newly specifying the length of the transmission permitted period that is longer than the length specified before the status of the retention of the transmission waiting data in the communication slave devices 102 is identified. Thus the period specification unit 302 is capable of newly specifying the length of the transmission prohibited period that is shorter than the length specified before the status of the retention of the transmission waiting data in the communication slave devices 102 is identified.

A process that is carried out by the period specification unit 302 corresponds to the period specification process.

The period storage unit 303 stores the length of the priority period, the length of the transmission permitted period, and the length of the transmission prohibited period that have been specified by the period specification unit 302. The period storage unit 303 also stores a communication delay amount for each of the communication slave devices 102 and an identifier of the communication slave device 102 with the longest communication delay amount.

The notification information generation unit 305 notifies each of the communication slave devices 102 of the length of the priority period, the length of the transmission permitted period, and the length of the transmission prohibited period that have been specified by the period specification unit 302. More specifically, the notification information generation unit 305 generates period notification information for notification to each of the communication slave devices 102 of the length of the priority period, the length of the transmission permitted period, and the length of the transmission prohibited period.

Along with the communication unit 304 that will be described later, the notification information generation unit 305 corresponds to the notification unit.

The communication unit 304 communicates with each of the communication slave devices 102 through the switching hub 103. Specifically, the communication unit 304 receives the priority data and the non-priority data that are transmitted from each of the communication slave devices 102. The communication unit 304 transmits the period notification information, generated by the notification information generation unit 305, to at least the communication slave devices 102 retaining the transmission waiting data.

As described above, the communication unit 304 along with the notification information generation unit 305 corresponds to the notification unit.

Figure 4:
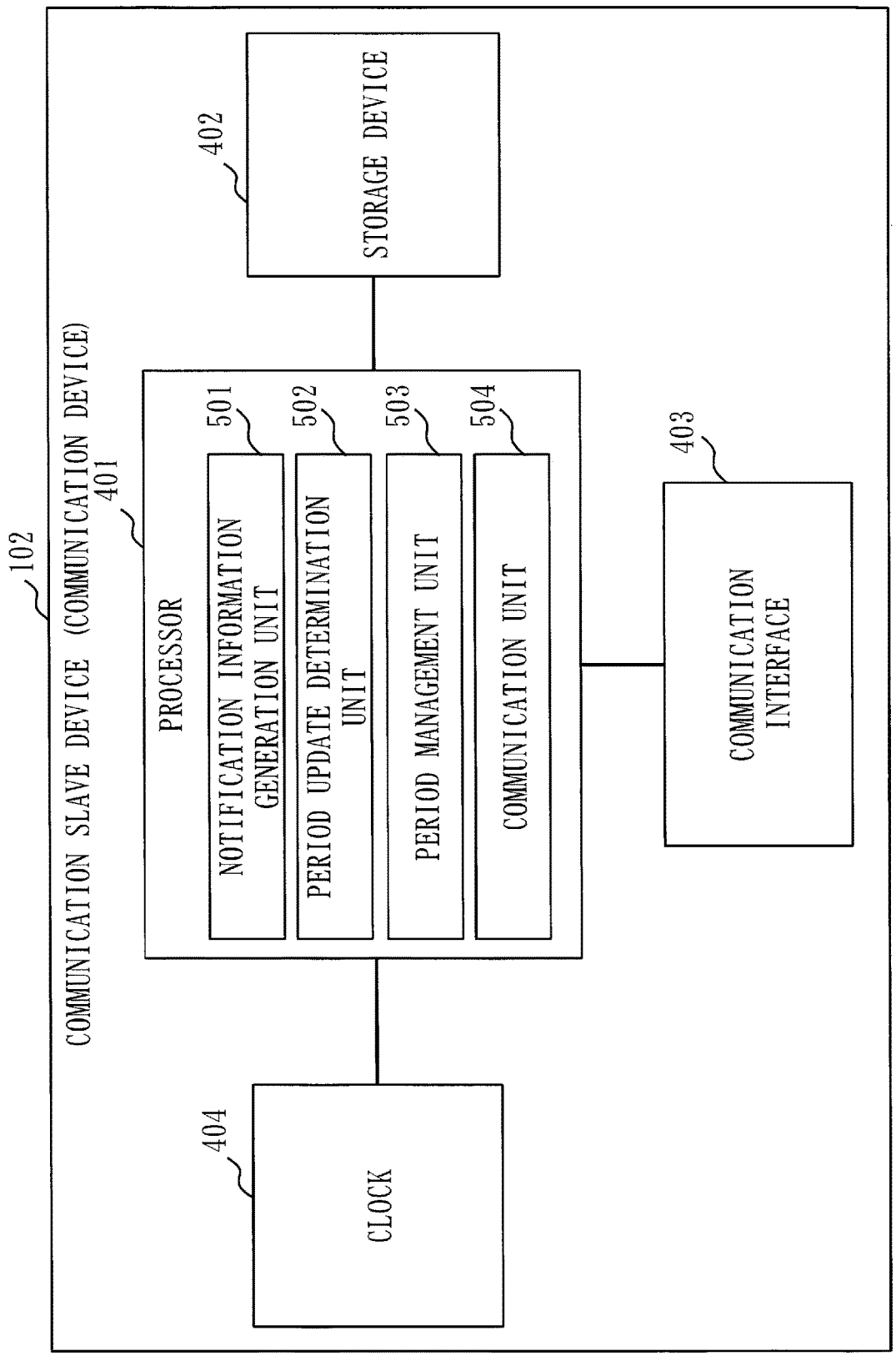
FIG. 4 is a diagram illustrating a hardware configuration example of a communication slave device according to Embodiment 1.

FIG. 4 illustrates a hardware configuration example of the communication slave device 102.

The communication slave device 102 is a computer.

The communication slave device 102 includes a processor 401, a storage device 402, a communication interface 403, and a clock 404, as hardware.

In the storage device 402, programs that fulfil functions of a notification information generation unit 501, a period update determination unit 502, a period management unit 503, and a communication unit 504 that will be described later are stored.

Operation of the notification information generation unit 501, the period update determination unit 502, the period management unit 503, and the communication unit 504 that will be described later is carried out by execution of the programs by the processor 401.

FIG. 4 schematically represents a state in which the processor 401 executes the programs that fulfil the functions of the notification information generation unit 501, the period update determination unit 502, the period management unit 503, and the communication unit 504.

The communication interface 403 is used for communication with the communication master device 101.

The clock 404 is used for time synchronization with the communication master device 101.

Figure 5:
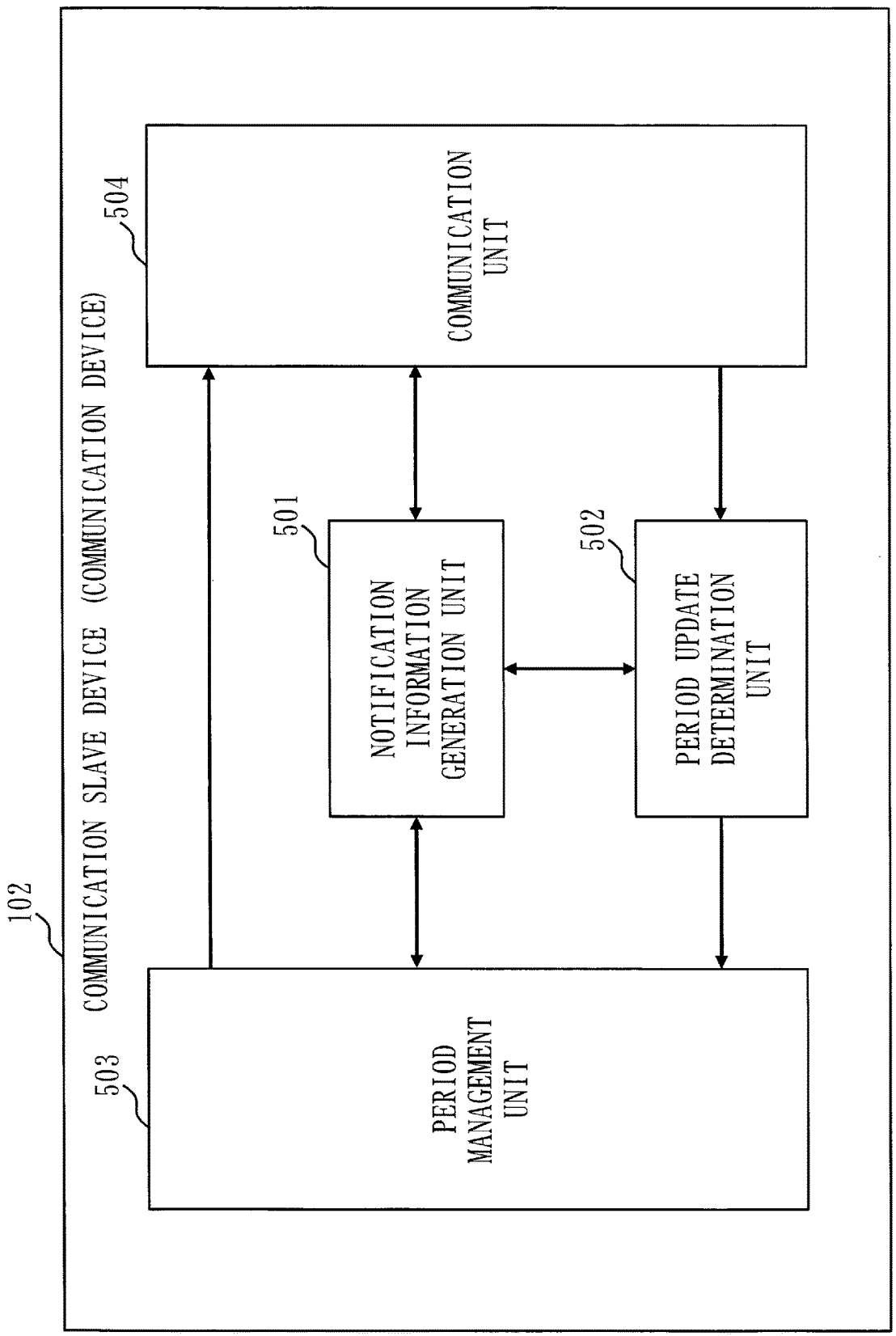
FIG. 5 is a diagram illustrating a functional configuration example of the communication slave device according to Embodiment 1.

FIG. 5 illustrates a functional configuration example of the communication slave device 102.

The communication slave device 102 is composed of the notification information generation unit 501, the period update determination unit 502, the period management unit 503, and the communication unit 504.

The notification information generation unit 501 generates the non-priority data retention notification information.

The period update determination unit 502 analyzes the period notification information from the communication master device 101 and thereby determines whether the transmission permitted period has been extended or not.

The period management unit 503 manages the communication periods. That is, start and end of the priority period, start and end of the transmission permitted period, and start and end of the transmission prohibited period are managed.

The communication unit 504 communicates with the communication master device 101. More specifically, the communication unit 504 transmits the priority data and the non-priority data to the communication master device 101. The communication unit 504 also transmits the non-priority data retention notification information to the communication master device 101. The communication unit 504 also receives the period notification information from the communication master device 101.

Description of Operation

Subsequently, operation of the communication master device 101 and the communication slave devices 102 according to the present embodiment will be described.

Initially, basic operation of the communication master device 101 and the communication slave devices 102 will be described.

At beginning, the communication master device 101 and the communication slave devices 102 carry out the time synchronization. The communication master device 101 and the communication slave devices 102 carry out the time synchronization with use of a conventional method such as IEEE1588 specification, for instance.

Subsequently, the communication master device 101 calculates the communication delay amount for each of the communication slave devices 102. For instance, the communication master device 101 transmits communication delay measurement data for measurement of the communication delay, to each of the communication slave devices 102. In the communication delay measurement data, transmission time measured by the clock 204 of the communication master device 101 is indicated. Upon reception of the communication delay measurement data, the communication slave devices 102 each measure reception time using the clock 404. The communication slave devices 102 each transmit response data, indicating the reception time, to the communication master device 101. Subsequently, the communication master device 101 receives the response data and calculates the communication delay amount for each of the communication slave devices 102, from a difference between the reception time indicated in the received response data and the transmission time in the communication delay measurement data. In the communication master device 101, the period storage unit 303 stores the communication delay amount calculated for each of the communication slave devices 102 and the identifier of the communication slave device 102 with the longest communication delay amount. In a case where the communication delay amount cannot be measured, the user of the communication master device 101 may set the communication delay amount.

In the communication master device 101, subsequently, the period specification unit 302 specifies the length of the priority period, the length of the transmission permitted period, and the length of the transmission prohibited period. Then the period storage unit 303 stores the length of the priority period, the length of the transmission permitted period, and the length of the transmission prohibited period that have been specified.

The notification information generation unit 305 generates the period notification information and the communication unit 304 transmits the period notification information through the switching hub 103 to all the communication slave devices 102.

Figure 6:
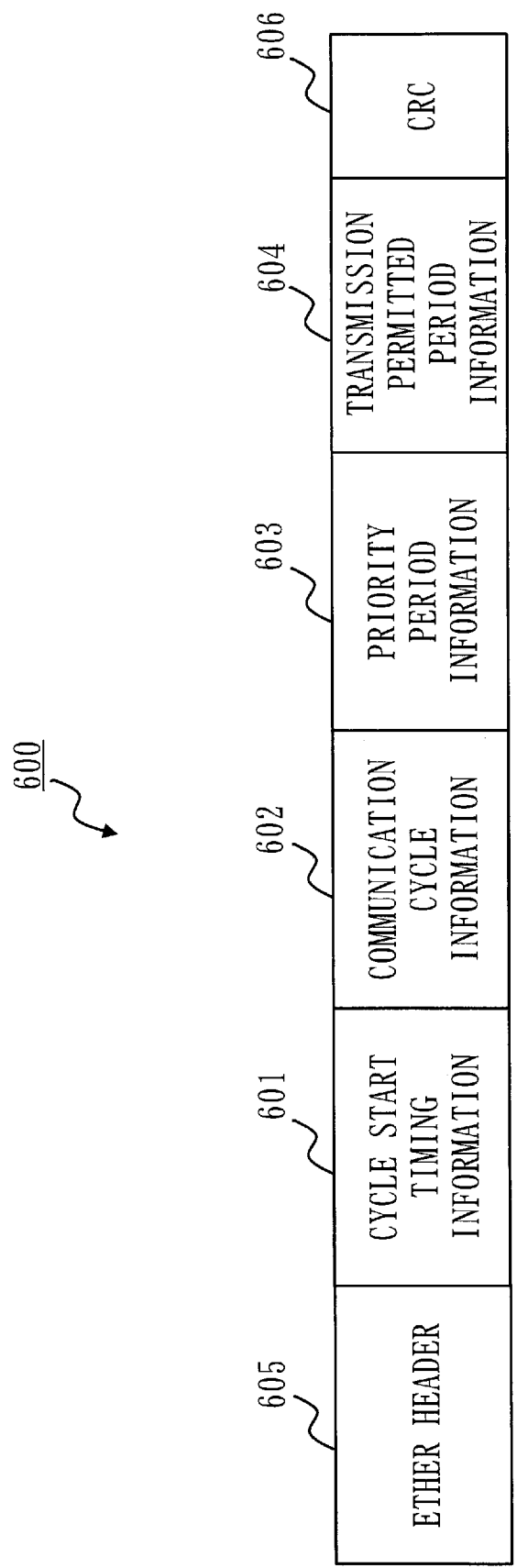
FIG. 6 is a diagram illustrating a format example of period notification information according to Embodiment 1.

FIG. 6 illustrates a format example of the period notification information.

In the example of FIG. 6, the period notification information is composed of cycle start timing information 601, communication cycle information 602, priority period information 603, transmission permitted period information 604, Ether header 605, and CRC (Cyclic Redundancy Check) 606.

The cycle start timing information 601 is information for notification of start time of a communication cycle to the communication slave devices 102.

The communication cycle information 602 is information for notification of a length of a communication cycle to the communication slave devices 102.

The priority period information 603 is information for notification of the length of the priority period to the communication slave devices 102.

The transmission permitted period information 604 is information for notification of the length of the transmission permitted period in the non-priority period to the communication slave devices 102.

The Ether header 605 is header information in Ethernet (registered trademark) scheme.

The CRC 606 is a code for error detection.

Though the length of the transmission prohibited period in the non-priority period may be calculated in each of the communication slave devices 102 from the communication cycle information 602, the priority section information 603, and the transmission permitted period information 604, explicit notification of the length of the transmission prohibited period may be made in the period notification information.

In the cycle start timing information 601, a value obtained by adding an offset value to the start time is described, the offset value being for start of communication preset for the communication master device 101.

In the communication cycle information 602, values in accordance with system requirements are described. The values of the communication cycle information 602 have been preset by the user of the communication master device 101.

In the priority period information 603, for instance, a value (the length of the priority period) preset by the user after estimation of an amount of the priority data, is described. The user may set the length of the priority period based on a predicted amount of the priority data collected from the communication slave devices 102 or an actual amount of past of the priority data. Alternatively, the period specification unit 302 may calculate the length of the priority period based on the predicted amount of the priority data or the actual amount of the past of the priority data. The priority period, however, should not exceed the communication cycle.

Before the number of the communication slave devices 102 retaining the transmission waiting data is identified, the length of the transmission permitted period calculated by the period specification unit 302 with use of following expression (1) is described in the transmission permitted period information 604.

$$\text{transmission permitted period} = (\text{communication cycle} - \text{priority period} - \text{maximum value of communication delay amount})/(\text{number of communication slave devices} + 1) \quad \text{Expression (1)}$$

Before the number of the communication slave devices 102 retaining the transmission waiting data is identified, in this manner, the period specification unit 302 specifies the value obtained by dividing the total time of the transmission permitted period and the transmission prohibited period ((communication cycle–priority period–maximum value of communication delay amount) in expression (1)) by the total number of the number of the communication slave devices 102 and the additional number, as the length of the transmission permitted period.

In expression (1), "1" is the additional number set in consideration of time required for a relaying process in the switching hubs 103. In a case where the switching hubs 103 of m (m≥1) stages exist between the communication master device 101 and the communication slave devices 102, the period specification unit 302 uses "m" as the additional number, for instance.

Expression (1) is an example. The period specification unit 302 may set a value resulting from truncating after decimal point from the value obtained from expression (1), as the length of the transmission permitted period. The period specification unit 302 may determine the length of the transmission permitted period by alteration to the value obtained from expression (1) in accordance with operation clock of the communication master device 101. The period specification unit 302 may determine the length of the transmission permitted period by a computational expression different from expression (1). A value of (transmission permitted period×(number of communication slave devices+1)), however, should not exceed the non-priority period.

The length of the transmission prohibited period is obtained by following expression (2).

$$\text{transmission prohibited period} = (\text{communication cycle} - \text{priority period} - \text{maximum value of communication delay amount}) - \text{transmission permitted period} \quad \text{Expression (2)}$$

After the number of the communication slave devices 102 retaining the transmission waiting data is identified, the length of the transmission permitted period calculated by the period specification unit 302 with use of following expression (3) is described in the transmission permitted period information 604.

$$\text{transmission permitted period} = (\text{communication cycle} - \text{priority period} - \text{maximum value of communication delay amount})/(\text{number of communication slave devices retaining transmission waiting data} + 1) \quad \text{Expression (3)}$$

After the number of the communication slave devices 102 retaining the transmission waiting data is identified, in this manner, the period specification unit 302 specifies a value obtained by dividing the total time of the transmission permitted period and the transmission prohibited period ((communication cycle–priority period–maximum value of communication delay amount) in expression (3)) by a total number of the number of the communication slave devices 102 retaining the transmission waiting data and the additional number, as the length of the transmission permitted period.

As with expression (1), "1" is the additional number set in consideration of the time required for the relaying process in the switching hub 103. In a case where the switching hubs 103 of m (m≥1) stages exist between the communication master device 101 and the communication slave devices 102, the period specification unit 302 uses "m" as the additional number, for instance.

Expression (3) is an example. The period specification unit 302 may set a value resulting from truncating after decimal point from the value obtained from expression (3), as the length of the transmission permitted period. The period specification unit 302 may determine the length of the transmission permitted period by alteration to the value obtained from expression (3) in accordance with the operation clock of the communication master device 101. The period specification unit 302 may determine the length of the transmission permitted period by a computational expression different from expression (3). A value of (transmission permitted period×(number of communication slave devices+1)), however, should not exceed the non-priority period.

The transmission prohibited period is obtained by expression (2) described above.

Figure 7:
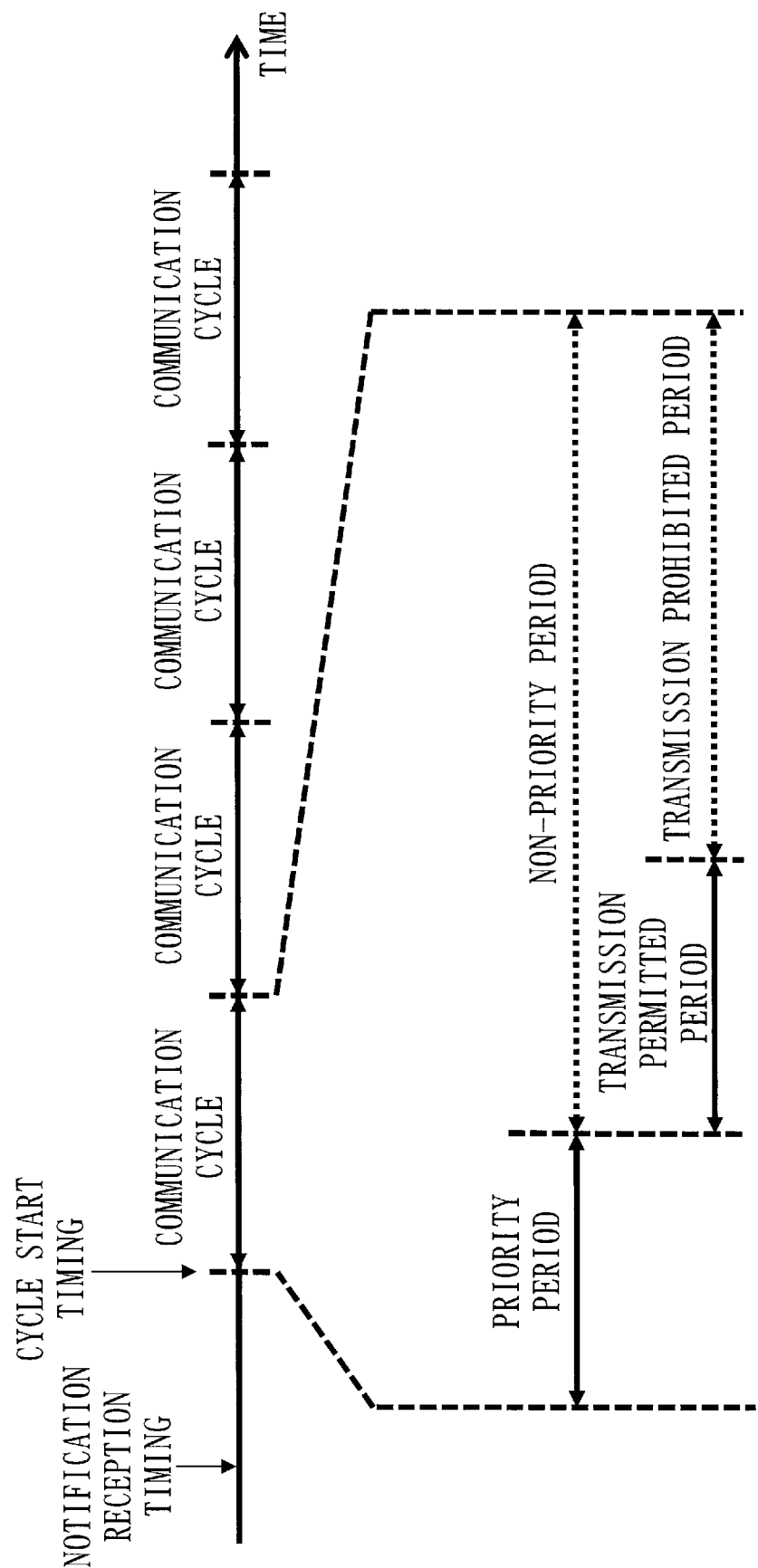
FIG. 7 is a diagram illustrating an example of a communication period according to Embodiment 1.

FIG. 7 illustrates an example of the communication period according to the present embodiment.

The period management unit 503 of the communication slave device 102 starts the communication cycles at cycle start timing indicated in the cycle start timing information 601 of the period notification information.

The period management unit 503 of the communication slave device 102 manages the communication cycles in accordance with the communication cycle information 602 of the period notification information.

One communication cycle is composed of the priority period and the non-priority period.

The communication unit 504 of the communication slave device 102 transmits the priority data to the communication master device 101 in accordance with notification from the period management unit 503 during the priority period indicated in the priority period information 603 of the period notification information.

The non-priority period is composed of the transmission permitted period and the transmission prohibited period.

The communication unit 504 of the communication slave device 102 transmits the non-priority data to the communication master device 101 in accordance with the notification from the period management unit 503 during the transmission permitted period indicated in the transmission permitted period information 604 of the period notification information.

The communication unit 504 of the communication slave device 102 suspends the transmission of the non-priority data in accordance with the notification from the period management unit 503 during the transmission prohibited period. The communication unit 504 accumulates the non-priority data in a transmission buffer during the transmission prohibited period.

Figure 8:
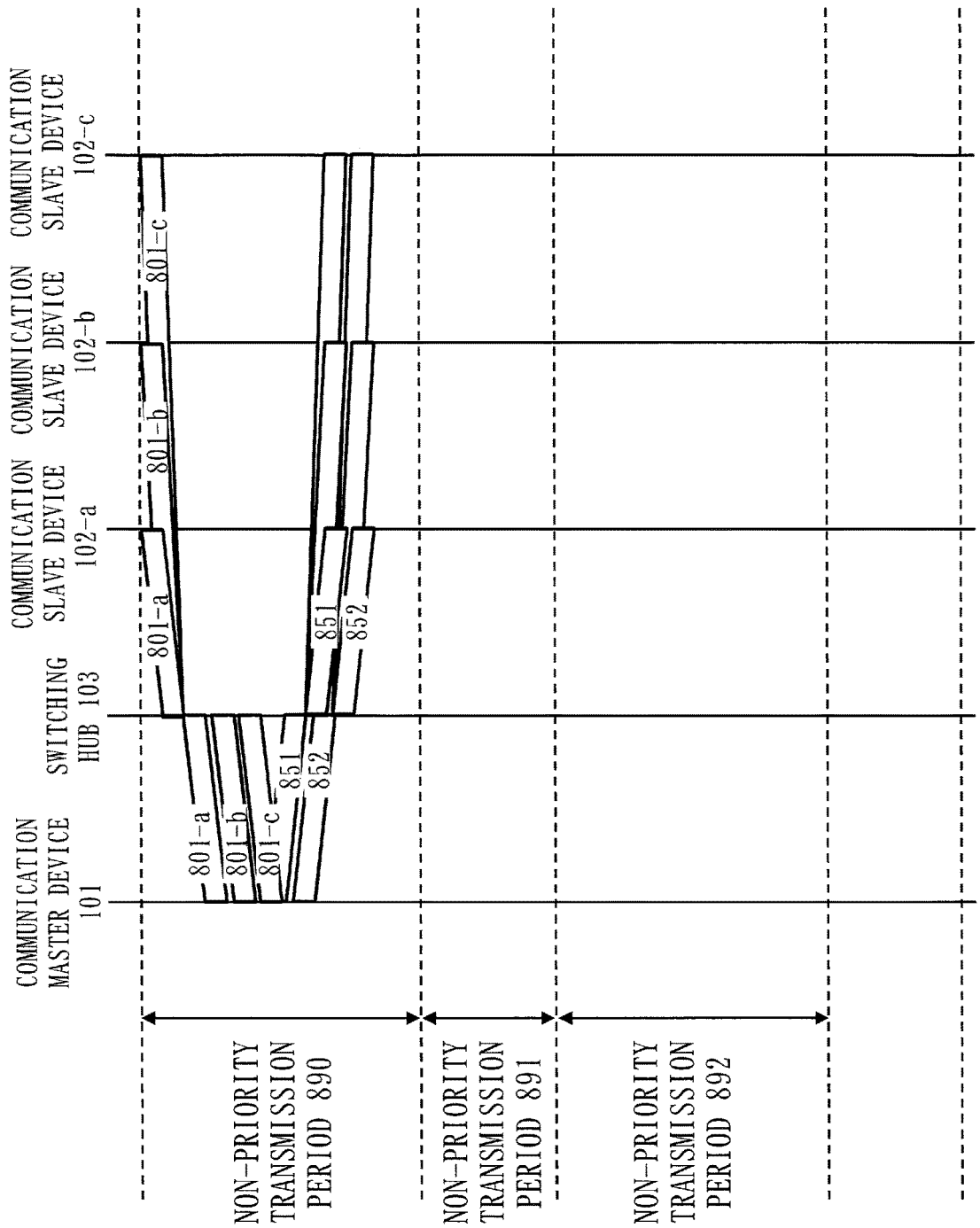
FIG. 8 is a diagram illustrating an example of operation of the communication master device and the communication slave devices according to Embodiment 1.

FIG. 8 illustrates an example of operation of the communication master device 101 and the communication slave devices 102 after the number of the communication slave devices 102 retaining the transmission waiting data is identified.

In the example of FIG. 8, the communication master device 101, the communication slave device 102-a, the communication slave device 102-b, and the communication slave device 102-c are connected to the switching hub 103.

FIG. 8 illustrates the example of the operation of the communication master device 101, the communication slave device 102-a, the communication slave device 102-b, and the communication slave device 102-c in the transmission permitted period.

A transmission permitted period 890 is the transmission permitted period calculated with use of expression (1) described above.

In each of the communication slave devices 102, initially, the period management unit 503 notifies the notification information generation unit 501 of an arrival of the non-priority period.

The notification information generation unit 501 inquires of the communication unit 504 whether the communication unit 504 retains the transmission waiting data or not, that is, whether the non-priority data has been accumulated in the transmission buffer or not. The communication unit 504 returns a response to the notification information generation unit 501 as to whether the communication unit 504 retains the transmission waiting data or not.

The notification information generation unit 501 generates the non-priority data retention notification information based on the response from the communication unit 504 and outputs the generated non-priority data retention notification information to the communication unit 504. In a case where the communication unit 504 does not retain the non-priority data (transmission waiting data), the notification information generation unit 501 instructs the period update determination unit 502 not to adopt an extended transmission permitted period even if the period update determination unit 502 receives the period notification information in which the transmission permitted period is extended from the communication master device 101.

The communication unit 504 transmits the non-priority data retention notification information to the communication master device 101.

In FIG. 8, the communication slave device 102-a transmits non-priority data retention notification information 801-a. The communication slave device 102-b transmits non-priority data retention notification information 801-b. The communication slave device 102-c transmits non-priority data retention notification information 801-c.

In FIG. 8, only the communication slave device 102-a is assumed to retain the non-priority data and the communication slave device 102-b and the communication slave device 102-c are assumed not to retain the non-priority data.

After that, each of the communication slave devices 102 transmits the retained non-priority data during the transmission permitted period 890. In the example of FIG. 8, only the communication slave device 102-a retaining the non-priority data transmits the non-priority data during the transmission permitted period 890.

Subsequently, an example of operation of the communication master device 101 that has received the non-priority data retention notification information will be described.

The investigation unit 301 of the communication master device 101 acquires the non-priority data retention notification information from the communication unit 304. The investigation unit 301 updates a non-priority data retention management table 900.

FIG. 9 illustrates an example of the non-priority data retention management table 900.

In the non-priority data retention management table 900, non-priority data retention status is managed for each of the communication slave devices 102.

Before the status of the retention of the non-priority data in the communication slave devices 102 is identified, more specifically, at time of the start of the transmission permitted period, the non-priority data retention status is set as "1" for all the communication slave devices 102, based on an assumption that all the communication slave devices 102 retain the non-priority data.

The investigation unit 301 updates the non-priority data retention status in the non-priority data retention management table 900 based on the non-priority data retention notification information from each of the communication slave devices 102.

Figure 10:
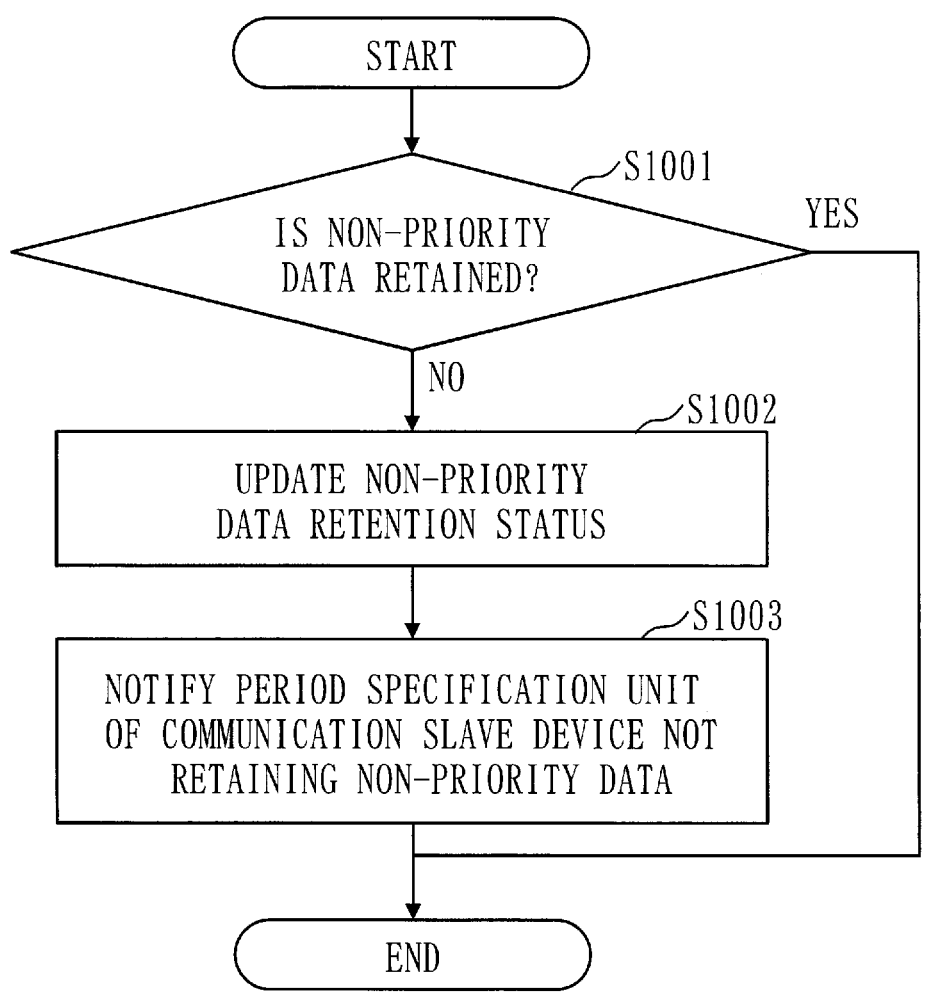
FIG. 10 is a flowchart illustrating an example of operation of the communication master device according to Embodiment 1.

FIG. 10 is a flowchart illustrating an example of operation of the investigation unit 301. With reference to FIG. 10, the example of the operation of the investigation unit 301 will be described.

Upon acquisition from the communication unit 304 of the non-priority data retention notification information from the communication slave devices 102, the investigation unit 301 analyzes the non-priority data retention notification information and thereby determines whether the communication slave devices 102 retain the non-priority data (transmission waiting data) or not (step S1001).

In a case where the communication slave devices 102 retain the non-priority data (transmission waiting data) (YES in step S1001), the investigation unit 301 ends the process.

In a case where a communication slave device 102 does not retain the non-priority data (transmission waiting data) (NO in step S1001), the investigation unit 301 updates the non-priority data retention status in the non-priority data retention management table 900. More specifically, a value of the non-priority data retention status of the pertinent communication slave devices 102 is altered into "0" (step S1002).

Subsequently, the investigation unit 301 notifies the period specification unit 302 of the communication slave device 102 that does not retain the non-priority data (transmission waiting data), that is, the communication slave device 102 whose value of the non-priority data retention status has been altered into "0" (step S1003).

When notified by the investigation unit 301 of the communication slave device 102 that does not retain the non-priority data, the period specification unit 302 recalculates the transmission permitted period.

When the investigation unit 301 acquires the non-priority data retention notification information 801-*a* from the communication slave device 102-*a*, in the example of FIG. 8, the investigation unit 301 does not update the non-priority data retention management table 900 because the communication slave device 102-*a* retains the non-priority data (YES in step S1001).

When the investigation unit 301 acquires the non-priority data retention notification information 801-*b* from the communication slave device 102-*b*, the investigation unit 301 alters the non-priority data retention status in the non-priority data retention management table 900 into "0" (step S1002) because the communication slave device 102-*b* does not retain the non-priority data (NO in step S1001). Then the investigation unit 301 gives the period specification unit 302 a notification about the communication slave device 102-*b*.

Upon being notified about the communication slave device 102-*b*, the period specification unit 302 recalculates the transmission permitted period.

Figure 11:
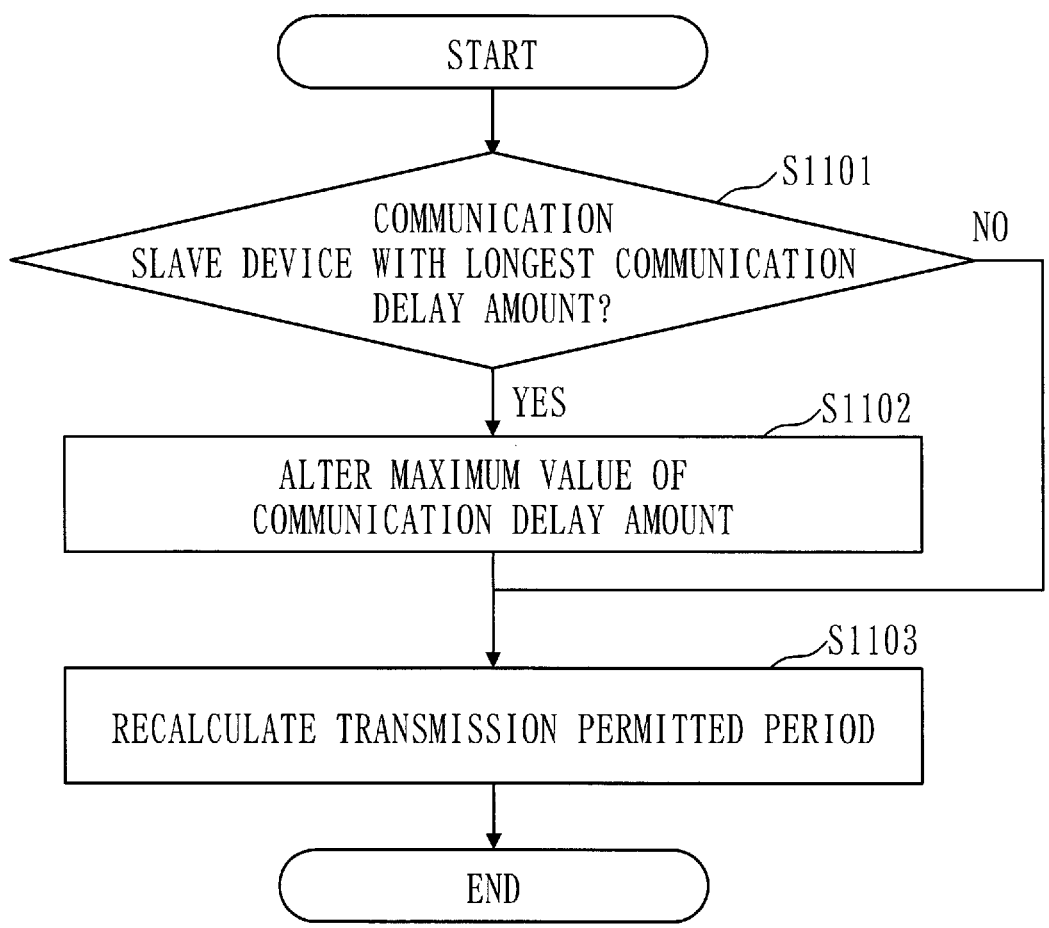
FIG. 11 is a flowchart illustrating an example of operation of the communication master device according to Embodiment 1.

FIG. 11 is a flowchart illustrating an example of operation of the period specification unit 302. With reference to FIG. 11, the example of the operation of the period specification unit 302 will be described.

The period specification unit 302 determines whether the communication slave device 102 about which the notification has been given by the investigation unit 301 is the communication slave device 102 with the longest communication delay amount or not (step S1101).

In the period storage unit 303, the identifier of the communication slave device 102 with the longest communication delay amount is stored.

The period specification unit 302 determines whether the identifier of the communication slave device 102 about which the notification has been given by the investigation unit 301 coincides with the identifier stored in the period storage unit 303 or not.

In a case where the communication slave device 102 about which the notification has been given by the investigation unit 301 is the communication slave device 102 with the longest communication delay amount (YES in step S1101), the period specification unit 302 alters the maximum value of the communication delay amount (step S1102). Specifically, the period specification unit 302 alters the identifier of the communication slave device 102 stored in the period storage unit 303 into the identifier of the communication slave device 102 with the longest communication delay amount among the communication slave devices 102 for which the non-priority data retention status is "1".

Finally, the period specification unit 302 recalculates the transmission permitted period in accordance with expression (3) described above (step S1103).

Specifically, the period specification unit 302 recalculates the transmission permitted period with use of the number of "1", described in the non-priority data retention status in the non-priority data retention management table 900, as "number of communication slave devices retaining transmission waiting data" in expression (3).

In Expression (4), "non-priority data retention status: number of 1" is a replacement for "number of communication slave devices retaining transmission waiting data" of expression (3) and the period specification unit 302 obtains a new length of the transmission permitted period with use of expression (4).

$$\text{transmission permitted period} = (\text{communication cycle} - \text{priority period} - \text{maximum value of communication delay amount})/(\text{non-priority data retention status: number of } 1 + 1) \quad \text{Expression (4)}$$

With use of expression (4), the period specification unit 302 obtains the length of the transmission permitted period that is longer than the length of the transmission permitted period calculated from expression (1).

In a case where the maximum value of the communication delay amount has been altered in step S1102, the maximum value of the communication delay amount to be used in a calculation of expression (4) is the maximum value after alteration. That is, the period specification unit 302 uses the communication delay amount for the communication slave device 102 having the identifiers stored in the period storage unit 303 for the calculation of expression (4).

As with expression (1), "1" is the additional number set in consideration of the time required for the relaying process in the switching hub 103. In a case where the switching hubs 103 of m (m≥1) stages exist between the communication master device 101 and the communication slave devices 102, the period specification unit 302 uses "m" as the additional number, for instance.

Expression (4) is an example. The period specification unit 302 may set a value resulting from truncating after decimal point from the value obtained from expression (4), as the length of the transmission permitted period. The period specification unit 302 may determine the length of the transmission permitted period by alteration to the value obtained from expression (4) in accordance with the operation clock of the communication master device 101. The period specification unit 302 may determine the length of the transmission permitted period by a computational expression different from expression (4). A value of (transmission permitted period×(number of communication slave devices+ 1)), however, should not exceed the non-priority period.

The transmission prohibited period is obtained by expression (2) described above.

Upon obtainment of the new transmission permitted period in step S1103, the period specification unit 302 notifies the notification information generation unit 305 of the new transmission permitted period.

The notification information generation unit 305 generates the period notification information in which the new transmission permitted period is indicated in the transmission permitted period information 604. Then the notification information generation unit 305 outputs the generated period notification information to the communication unit 304. The communication unit 304 transmits the period notification information to all the communication slave devices 102. In the example of FIG. 8, the communication unit 304 transmits period notification information 851. It is acceptable that the communication unit 304 transmits the period notification information 851 to only the communication slave devices 102 retaining the non-priority data.

Subsequently, an example of operation of the communication slave device 102-*a*, the communication slave device 102-*b*, and the communication slave device 102-*c* upon reception of the period notification information 851 will be described.

The communication slave device 102-*a* has notified the communication master device 101 that communication slave device 102-*a* retains the non-priority data and thus the period update determination unit 502 of the communication slave device 102-*a* determines to extend the transmission permitted period. That is, the period update determination unit 502 determines to transmit the non-priority data in accordance with the transmission permitted period about which notification has been made in the period notification information 851.

The period update determination unit 502 notifies the period management unit 503 of the transmission permitted period indicated in the transmission permitted period information 604 of the period notification information 851.

The period management unit 503 extends the transmission permitted period 890 to a transmission permitted period 891. As a result, the communication slave device 102-*a* is allowed to transmit the non-priority data till the transmission permitted period 891.

In the communication slave device 102-*b* and the communication slave device 102-*c*, by contrast, the communication unit 504 does not retain the non-priority data as described above and thus the notification information generation unit 501 instructs the period update determination unit 502 not to extend the transmission permitted period upon reception of the period notification information 851. In the communication slave device 102-*b* and the communication slave device 102-*c*, therefore, the period update determination unit 502 determines not to extend the transmission permitted period. As a result, the period update determination unit 502 does not notify the period management unit 503 of the extended transmission permitted period indicated in the transmission permitted period information 604 of the period notification information 851.

After that, similar operation is carried out when the communication master device 101 receives the non-priority data retention notification information 801-*c* from the communication slave device 102-*c*. Then the period specification unit 302 of the communication master device 101 calculates the transmission permitted period that is further longer. As a result, the communication slave device 102-*a* is allowed to transmit the non-priority data till the transmission permitted period 892.

Description of Effects of Embodiment

In the present embodiment, as described above, the length of the transmission permitted period and the length of the transmission prohibited period that are appropriate are dynamically determined based on the status of the retention of the transmission waiting data. According to the present embodiment, therefore, the relaying of the non-priority data transmitted in the transmission permitted period is completed within the transmission prohibited period, so that a situation can be avoided in which the delay occurs in the transmission of the priority data having higher priority due to the non-priority data having lower priority. According to the present embodiment, additionally, a communication efficiency for the non-priority data can be increased.

Embodiment 2

In Embodiment 1, the length of the transmission permitted period and the length of the transmission prohibited period are specified based on whether the communication slave devices 102 retain the non-priority data or not. In the present embodiment, an example in which the communication master device 101 specifies the length of the transmission permitted period and the length of the transmission prohibited period with additional use of retaining amounts of the non-priority data in the communication slave devices 102 retaining the non-priority data will be described.

Description of Configurations

A configuration example of a communication system according to the present embodiment is as illustrated in FIG. 1.

A hardware configuration example of the communication master device 101 according to the present embodiment is as illustrated in FIG. 2.

A functional configuration example of the communication master device 101 according to the present embodiment is as illustrated in FIG. 3.

A hardware configuration example of the communication slave device 102 according to the present embodiment is as illustrated in FIG. 4.

A functional configuration example of the communication slave device 102 according to the present embodiment is as illustrated in FIG. 5.

Hereinbelow, differences from Embodiment 1 will be principally described. Particulars that will not be described below are the same as particulars described in Embodiment 1.

In each of the communication slave devices 102, as described in Embodiment 1, the period management unit 503 initially notifies the notification information generation unit 501 of the arrival of the non-priority period.

The notification information generation unit 501 inquires of the communication unit 504 an accumulated amount of the non-priority data (transmission waiting data). The communication unit 504 notifies the notification information generation unit 501 of the accumulated amount of the non-priority data (transmission waiting data). The notification information generation unit 501 calculates transmission prediction time with use of following expression (5). The transmission prediction time is time that is predicted to be required for the transmission of the non-priority data (transmission waiting data).

$$\text{transmission prediction time} = \{\text{accumulated byte amount of non-priority data} + \text{number of retained frames} \times (\text{Ether header length} + \text{CRC length})\} / \text{transmission speed of Ethernet} \quad \text{Expression (5)}$$

In expression (5), "accumulated byte amount of non-priority data" is the accumulated amount of the non-priority data (transmission waiting data) about which notification has been made by the communication unit 504. The "number of retained frames" is the number of the non-priority data (transmission waiting data) retained in the transmission buffer.

Subsequently, the notification information generation unit 501 makes a comparison between the transmission prediction time and the transmission permitted period that is reference time and that is calculated with use of expression (1). In a case where the transmission prediction time is shorter than the transmission permitted period, the notification information generation unit 501 generates the non-priority data retention notification information notifying that the transmission prediction time is shorter than the transmission permitted period.

Then the notification information generation unit 501 transmits the non-priority data retention notification information through the communication unit 504 to the communication master device 101.

In a case where the transmission prediction time is shorter than the transmission permitted period, the notification information generation unit 501 instructs the period update determination unit 502 not to extend the transmission permitted period even if the period update determination unit 502 receives from the communication master device 101, the period notification information in which the transmission permitted period is extended.

The investigation unit 301 of the communication master device 101 acquires the non-priority data retention notification information from the communication unit 304. The investigation unit 301 investigates the number of the communication slave devices 102 for which the transmission prediction time is equal to or longer than the transmission permitted period, with use of the non-priority data retention notification information.

Then the period specification unit 302 calculates a new length of the transmission permitted period with use of following expression (6).

transmission permitted period=(communication cycle−priority period−maximum value of communication delay amount)/(number of communication slave devices for which transmission prediction time is equal to or longer than transmission permitted period+1)   Expression (6)

With use of expression (6), the period specification unit 302 obtains the length of the transmission permitted period that is longer than the length of the transmission permitted period calculated from expression (1).

The maximum value of the communication delay amount to be used in calculation of expression (6) is the maximum value among the communication delay amounts for the communication slave devices 102 for which the transmission prediction time is equal to or longer than the transmission permitted period.

As with expression (1), "1" is the additional number set in consideration of the time required for the relaying process in the switching hub 103. In a case where the switching hubs 103 of m (m≥1) stages exist between the communication master device 101 and the communication slave devices 102, the period specification unit 302 uses "m" as the additional number, for instance.

Expression (6) is an example. The period specification unit 302 may set a value resulting from truncating after decimal point from the value obtained from expression (6), as the length of the transmission permitted period. The period specification unit 302 may determine the length of the transmission permitted period by alteration to the value obtained from expression (6) in accordance with the operation clock of the communication master device 101. The period specification unit 302 may determine the length of the transmission permitted period by a computational expression different from expression (6). A value of (transmission permitted period×(number of communication slave devices+1)), however, should not exceed the non-priority period.

The transmission prohibited period is obtained by expression (2) described above.

A subsequent procedure is as described in relation to Embodiment 1 and thus description of the procedure is omitted.

Such operation as described above makes it possible to extend the transmission permitted period even if there are some communication slave devices in which small amounts of the non-priority data have been accumulated. According to the present embodiment, therefore, the communication efficiency for the non-priority data can be increased.

As for Embodiment 1 and Embodiment 2, the examples in which the period specification unit 302 specifies the length of the transmission permitted period and the length of the transmission prohibited period in n-th (n≥1) communication cycle, based on the status of the retention of the transmission waiting data in the communication slave devices 102 in the n-th communication cycle have been described.

Alternatively, the period specification unit 302 may specify the length of the transmission permitted period and the length of the transmission prohibited period in (n+1)-th communication cycle, based on the status of the retention of the transmission waiting data in the communication slave devices 102 in the n-th communication cycle.

In Embodiment 1 and Embodiment 2, the period specification unit 302 of the communication master device 101 recalculates the length of the transmission permitted period each time of reception of the non-priority data retention notification information from the communication slave devices 102.

Alternatively, the period specification unit 302 may recalculates the length of the transmission permitted period after the reception of the non-priority data retention notification information from all the communication slave devices 102. Thus a calculation amount in the period specification unit 302 can be decreased. In addition, the number of pieces of the period notification information that are transmitted from the communication master device 101 can be decreased, so that a bandwidth can be effectively utilized.

Though the embodiments of the invention have been described above, the two embodiments may be embodied in combination.

Alternatively, one of the two embodiments may be partially implemented.

Alternatively, a partial combination of the two embodiments may be implemented.

The present invention is not limited to the embodiments and various modifications thereto may be made as appropriate.

Description of Hardware Configuration

Finally, a supplementary description will be given on the hardware configurations of the communication master device 101 and the communication slave devices 102.

Each of the processor 201 and the processor 401 is an IC (Integrated Circuit) that carries out processing.

Each of the processor 201 and the processor 401 is a CPU (Central Processing Unit), a DSP (Digital Signal Processor), or the like.

Each of the storage device 202 and the storage device 402 is a RAM (Random Access Memory), a ROM (Read Only Memory), a flash memory, an HDD (Hard Disk Drive), or the like.

Each of the communication interface 203 and the communication interface 403 is an electronic circuit that carries out communication processing for data.

Each of the communication interface 203 and the communication interface 403 is a communication chip or an NIC (Network Interface Card), for instance.

An OS (Operating System) is also stored in the storage device 202.

At least a portion of the OS is executed by the processor 201.

The processor 201 executes the programs that fulfil the functions of the investigation unit 301, the period specification unit 302, the communication unit 304, and the notification information generation unit 305, while executing at least a portion of the OS.

Through the execution of the OS by the processor 201, task management, memory management, file management, communication control, or the like is carried out.

At least any of information, data, signal values, and variable values that indicate results of processes of the investigation unit 301, the period specification unit 302, the communication unit 304, and the notification information generation unit 305 is stored in at least any of the storage device 202, and a register and a cache memory in the processor 201.

The programs that fulfil the functions of the investigation unit 301, the period specification unit 302, the communication unit 304, and the notification information generation unit 305 may be stored in a portable storage medium such as a magnetic disc, a flexible disc, an optical disc, a compact disc, a Blu-ray (registered trademark) disc, or a DVD.

The OS is also stored in the storage device 402.

At least a portion of the OS is executed by the processor 401.

The processor 401 executes the programs that fulfil the functions of the notification information generation unit 501, the period update determination unit 502, the period management unit 503, and the communication unit 504, while executing at least the portion of the OS.

Through execution of the OS by the processor 401, task management, memory management, file management, communication control, or the like is carried out.

At least any of information, data, signal values, and variable values that indicate results of processes of the notification information generation unit 501, the period update determination unit 502, the period management unit 503, and the communication unit 504 is stored in at least any of the storage device 402, and a register and a cache memory in the processor 401.

The programs that fulfil the functions of the notification information generation unit 501, the period update determination unit 502, the period management unit 503, and the communication unit 504 may be stored in a portable storage medium such as a magnetic disc, a flexible disc, an optical disc, a compact disc, a Blu-ray (registered trademark) disc, or a DVD.

The "unit" of the investigation unit 301, the period specification unit 302, the communication unit 304, and the notification information generation unit 305 may be read as "circuit", "step", "procedure", or "process".

The communication master device 101 may be implemented by a processing circuit. The processing circuit is a logic IC (Integrated Circuit), a GA (Gate Array), an ASIC (Application Specific Integrated Circuit), or an FPGA (Field-Programmable Gate Array), for instance.

In this case, the investigation unit 301, the period specification unit 302, the communication unit 304, and the notification information generation unit 305 are each implemented as a portion of the processing circuit.

The "unit" of the notification information generation unit 501, the period update determination unit 502, the period management unit 503, and the communication unit 504 may be read as "circuit", "step", "procedure", or "process".

The communication master device 101 may be implemented by the processing circuit. The processing circuit is a logic IC, a GA, an ASIC, or an FPGA, for instance.

In this case, the notification information generation unit 501, the period update determination unit 502, the period management unit 503, and the communication unit 504 are each implemented as a portion of the processing circuit.

Herein, a broader concept of processor, storage device, combination of processor and storage device, and processing circuit is referred to as "processing circuitry".

That is, the processor, the storage device, the combination of the processor and the storage device, and the processing circuit are specific examples of "processing circuitry".

REFERENCE SIGNS LIST

101: communication master device; 102: communication slave device; 103: switching hub; 201: processor; 202: storage device; 203: communication interface; 204: clock; 301: investigation unit; 302: period specification unit; 303: period storage unit; 304: communication unit; 305: notification information generation unit; 401: processor; 402: storage device; 403: communication interface; 404: clock; 501: notification information generation unit; 502: period update determination unit; 503: period management unit; 504: communication unit.

The invention claimed is:

1. A management device to manage a plurality of communication devices in accordance with a communication cycle including a priority period being a period in which priority data is transmitted, the management device comprising:
processing circuitry:
to investigate as status of retention of transmission waiting data in the plurality of communication devices, the number of the communication devices retaining the transmission waiting data; and
to specify as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and to specify as a length of a transmission prohibited period in which the transmission of the transmission waiting data is prohibited, a value obtained by subtracting the specified length of the transmission permitted period from the subtracted time, before the number of the communication devices retaining the transmission waiting data is identified, and to specify as a new length of the transmission permitted period, a value obtained by dividing the subtracted time by a total number of the number of the communication devices retaining the transmission waiting data and the additional number, and to specify as a new length of the transmission prohibited period, a value obtained by subtracting the specified new length of the transmission permitted period from the subtracted time, after the number of the communication devices retaining the transmission waiting data is identified.

2. The management device according to claim 1, wherein the management device is connected through one or more relay devices to the plurality of communication devices, and the processing circuitry uses the additional number corresponding to the number of the relay devices placed between the management device and the plurality of communication devices.

3. The management device according to claim 1, wherein after the status of the retention of the transmission waiting data in the plurality of communication devices is identified, the processing circuitry newly specifies the length of the transmission permitted period that is longer than the length specified before the status of the retention of the transmission waiting data in the plurality of communication devices is identified and newly specifies the length of the transmission prohibited period that is shorter than the length specified before the status of the retention of the transmission waiting data in the plurality of communication devices is identified, based on the status of the retention of the transmission waiting data in the plurality of communication devices.

4. The management device according to claim 1, wherein each time the status of the retention of the transmission waiting data in the plurality of communication devices is updated, the processing circuitry newly specifies the length of the transmission permitted period and the length of the transmission prohibited period, based on the updated status of the retention of the transmission waiting data.

5. The management device according to claim 1, wherein the management device is connected through a relay device to the plurality of communication devices, and
the processing circuitry specifies the length of the transmission permitted period and the length of the transmission prohibited period so that relaying of the transmission waiting data transmitted to the relay device from a communication device retaining the transmission waiting data within the transmission permitted period is completed within the transmission prohibited period in the relay device.

6. The management device according to claim 1, wherein the processing circuitry notifies the plurality of communication devices of the length of the transmission permitted period specified before the status of the retention of the transmission waiting data in the plurality of communication devices is identified and to notify at least the communication device retaining the transmission waiting data of the new length of the transmission permitted period specified after the status of the retention of the transmission waiting data in the plurality of communication devices is identified.

7. The management device according to claim 1, wherein based on the status of the retention of the transmission waiting data in the plurality of communication devices in n-th (n≥1) communication cycle, the processing circuitry specifies the length of the transmission permitted period and the length of the transmission prohibited period in (n+1)-th communication cycle.

8. A management device to manage a plurality of communication devices in accordance with a communication cycle including a priority period being a period in which priority data is transmitted, the management device comprising:
processing circuitry:
to investigate as status of retention of transmission waiting data in the plurality of communication devices, the number of the communication devices whose transmission prediction time that is predicted to be required for the transmission of the transmission waiting data is equal to or longer than reference time; and
to specify as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and
to specify as a length of a transmission prohibited period in which the transmission of the transmission waiting data is prohibited, a value obtained by subtracting the specified length of the transmission permitted period from the subtracted time, before the number of the communication devices whose transmission prediction time is equal to or longer than reference time is identified, and to specify as a new length of the transmission permitted period, a value obtained by dividing the subtracted time by the total number of the number of the communication devices whose transmission prediction time is equal to or longer than the reference time and the additional number, and to specify as a new length of the transmission prohibited period, a value obtained by subtracting the specified new length of the transmission permitted period from the subtracted time, after the number of the communication devices whose transmission prediction time is equal to or longer than reference time is identified.

9. The management device according to claim 8, wherein the management device is connected through one or more relay devices to the plurality of communication devices, and
the processing circuitry uses the additional number corresponding to the number of the relay devices placed between the management device and the plurality of communication devices.

10. The management device according to claim 8, wherein
after the status of the retention of the transmission waiting data in the plurality of communication devices is identified, the processing circuitry newly specifies the length of the transmission permitted period that is longer than the length specified before the status of the retention of the transmission waiting data in the plurality of communication devices is identified and newly specifies the length of the transmission prohibited period that is shorter than the length specified before the status of the retention of the transmission waiting data in the plurality of communication devices is identified, based on the status of the retention of the transmission waiting data in the plurality of communication devices.

11. The management device according to claim 8, wherein each time the status of the retention of the transmission waiting data in the plurality of communication devices is updated, the processing circuitry newly specifies the length of the transmission permitted period and the length of the transmission prohibited period, based on the updated status of the retention of the transmission waiting data.

12. The management device according to claim 8, wherein
the management device is connected through a relay device to the plurality of communication devices, and the processing circuitry specifies the length of the transmission permitted period and the length of the transmission prohibited period so that relaying of the transmission waiting data transmitted to the relay device from a communication device retaining the transmission waiting data within the transmission permitted period is completed within the transmission prohibited period in the relay device.

13. The management device according to claim 8, wherein
the processing circuitry notifies the plurality of communication devices of the length of the transmission permitted period specified before the status of the retention of the transmission waiting data in the plurality of communication devices is identified and to notify at least the communication device retaining the transmission waiting data of the new length of the transmission permitted period specified after the status of the retention of the transmission waiting data in the plurality of communication devices is identified.

14. The management device according to claim 8, wherein
based on the status of the retention of the transmission waiting data in the plurality of communication devices in n-th (n≥1) communication cycle, the processing circuitry specifies the length of the transmission permitted period and the length of the transmission prohibited period in (n+1)-th communication cycle.

15. A communication system comprising:
a plurality of communication devices; and
a management device to manage the plurality of communication devices in accordance with a communication cycle including a priority period being a period in which priority data is transmitted, wherein
the plurality of communication devices each notify the management device, as status of retention of transmission waiting data of each, whether or not each retains the transmission waiting data, and
the management device specifies as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and specifies as a length of a transmission prohibited period in which the transmission of the transmission waiting data is prohibited, a value obtained by subtracting the specified length of the transmission permitted period from the subtracted time, before the number of the communication devices retaining the transmission waiting data is identified, and specifies as a new length of the transmission permitted period, a value obtained by dividing the subtracted time by a total number of the number of the communication devices retaining the transmission waiting data and the additional number, and specifies as a new length of the transmission prohibited period, a value obtained by subtracting the specified new length of the transmission permitted period from the subtracted time, after the number of the communication devices retaining the transmission waiting data is identified.

16. A communication system comprising:
a plurality of communication devices; and
a management device to manage the plurality of communication devices in accordance with a communication cycle including a priority period being a period in which priority data is transmitted, wherein
the plurality of communication devices each notify the management device as status of retention of transmission waiting data of each, whether or not transmission prediction time that is predicted to be required for the transmission of the transmission waiting data is equal to or longer than reference time, and
the management device specifies as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and specifies as a length of a transmission prohibited period in which the transmission of the transmission waiting data is prohibited, a value obtained by subtracting the specified length of the transmission permitted period from the subtracted time, before the number of the communication devices whose transmission prediction time is equal to or longer than reference time is identified, and specifies as a new length of the transmission permitted period, a value obtained by dividing the subtracted time by the total number of the number of the communication devices whose transmission prediction time is equal to or longer than the reference time and the additional number, and specifies as a new length of the transmission prohibited period, a value obtained by subtracting the specified new length of the transmission permitted period from the subtracted time, after the number of the communication devices whose transmission prediction time is equal to or longer than reference time is identified.

17. A management method of managing a plurality of communication devices in accordance with a communication cycle including a priority period being a period in which priority data is transmitted, the management method comprising:
investigating as status of retention of transmission waiting data in the plurality of communication devices, the number of the communication devices retaining the transmission waiting data; and
specifying as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and specifying as a length of a transmission prohibited period in which the transmission of the transmission waiting data is prohibited, a value obtained by subtracting the specified length of the transmission permitted period from the subtracted time, before the number of the communication devices retaining the transmission waiting data is identified, and specifying as a new length of the transmission permitted period, a value obtained by dividing the subtracted time by a total number of the number of the communication devices retaining the transmission waiting data and the additional number, and specifying as a new length of the transmission prohibited period, a value obtained by subtracting the specified new length of the transmission permitted period from the subtracted time, after the number of the communication devices retaining the transmission waiting data is identified.

18. A management method of managing a plurality of communication devices in accordance with a communication cycle including a priority period being a period in which priority data is transmitted, the management method comprising:

investigating as status of retention of transmission waiting data in the plurality of communication devices, the number of the communication devices whose transmission prediction time that is predicted to be required for the transmission of the transmission waiting data is equal to or longer than reference time; and specifying as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and specifying as a length of a transmission prohibited period in which the transmission of the transmission waiting data is prohibited, a value obtained by subtracting the specified length of the transmission permitted period from the subtracted time, before the number of the communication devices whose transmission prediction time is equal to or longer than reference time is identified, and specifying as a new length of the transmission permitted period, a value obtained by dividing the subtracted time by the total number of the number of the communication devices whose transmission prediction time is equal to or longer than the reference time and the additional number, and specifying as a new length of the transmission prohibited period, a value obtained by subtracting the specified new length of the transmission permitted period from the subtracted time, after the number of the communication devices whose transmission prediction time is equal to or longer than reference time is identified.

19. A non-transitory computer readable medium storing a management program that causes a computer, which manages a plurality of communication devices in accordance with a communication cycle including a priority period being a period in which priority data is transmitted, to execute:

an investigation process of investigating as status of retention of transmission waiting data in the plurality of communication devices, the number of the communication devices retaining the transmission waiting data; and a period specification process of specifying as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and of specifying as a length of a transmission prohibited period in which the transmission of the transmission waiting data is prohibited, a value obtained by subtracting the specified length of the transmission permitted period from the subtracted time, before the number of the communication devices retaining the transmission waiting data is identified, and of specifying as a new length of the transmission permitted period, a value obtained by dividing the subtracted time by a total number of the number of the communication devices retaining the transmission waiting data and the additional number, and of specifying as a new length of the transmission prohibited period, a value obtained by subtracting the specified new length of the transmission permitted period from the subtracted time, after the number of the communication devices retaining the transmission waiting data is identified.

20. A non-transitory computer readable medium storing a management program that causes a computer, which manages a plurality of communication devices in accordance with a communication cycle including a priority period being a period in which priority data is transmitted, to execute:

an investigation process of investigating as status of retention of transmission waiting data in the plurality of communication devices, the number of the communication devices whose transmission prediction time that is predicted to be required for the transmission of the transmission waiting data is equal to or longer than reference time; and a period specification process of specifying as a length of a transmission permitted period in which transmission of the transmission waiting data is permitted, a value obtained by dividing subtracted time by a total number of the number of the plurality of communication devices and a predetermined additional number, the subtracted time being obtained by subtracting the priority period and a maximum value of communication delay amount among the plurality of communication devices from the communication cycle, and of specifying as a length of a transmission prohibited period in which the transmission of the transmission waiting data is prohibited, a value obtained by subtracting the specified length of the transmission permitted period from the subtracted time, before the number of the communication devices whose transmission prediction time is equal to or longer than reference time is identified, and of specifying as a new length of the transmission permitted period, a value obtained by dividing the subtracted time by the total number of the number of the communication devices whose transmission prediction time is equal to or longer than the reference time and the additional number, and of specifying as a new length of the transmission prohibited period, a value obtained by subtracting the specified new length of the transmission permitted period from the subtracted time, after the number of the communication devices whose transmission prediction time is equal to or longer than reference time is identified.

* * * * *